United States Patent
Lau

(10) Patent No.: US 11,163,524 B2
(45) Date of Patent: *Nov. 2, 2021

(54) ADJUSTING VOLUME LEVELS OF SPEAKERS

(71) Applicant: DTS, Inc., Calabasas, CA (US)

(72) Inventor: Dannie Lau, Los Angeles, CA (US)

(73) Assignee: DTS, Inc., Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,345

(22) Filed: Sep. 17, 2020

(65) Prior Publication Data

US 2021/0004202 A1 Jan. 7, 2021

Related U.S. Application Data

(63) Continuation of application No. 15/617,692, filed on Jun. 8, 2017, now Pat. No. 10,795,637.

(51) Int. Cl.
*H03G 3/00* (2006.01)
*G06F 3/16* (2006.01)
*H04R 3/12* (2006.01)

(52) U.S. Cl.
CPC .............. *G06F 3/165* (2013.01); *H04R 3/12* (2013.01); *H04R 2430/01* (2013.01)

(58) Field of Classification Search
CPC ........ G06F 3/165; H04R 3/12; H04R 2430/01
USPC ................................................ 381/104, 105
See application file for complete search history.

(56) References Cited

U.S. PATENT DOCUMENTS

| | | | |
|---|---|---|---|
| 7,021,142 | B2 | 4/2006 | Roark |
| 7,158,642 | B2 | 1/2007 | Tsuhako |
| 7,848,527 | B2 | 12/2010 | Dorogusker |
| 7,983,426 | B2 | 7/2011 | Schuler et al. |
| 8,199,919 | B2 | 6/2012 | Goldstein et al. |
| 9,008,319 | B2 | 4/2015 | Bayley et al. |

(Continued)

FOREIGN PATENT DOCUMENTS

WO WO-2018227085 12/2018

OTHER PUBLICATIONS

U.S. Appl. No. 15/617,692 U.S. Pat. No. 10,795,637, filed Jun. 8, 2017, Adjusting Volume Levels of Speakers.

(Continued)

*Primary Examiner* — Ammar T Hamid
(74) *Attorney, Agent, or Firm* — Schwegman Lundbert & Woessner, P.A.

(57) ABSTRACT

When the volume is adjusted in a multi-speaker system, it is desirable that one speaker does not change volume disproportionately with respect to another speaker. A method is presented for adjusting a volume level of one or more speakers. Each speaker can have a non-standardized relationship between logical volume level that is input to the speaker and sound pressure level that is produced by the speaker. A selected volume level, corresponding to a sound pressure level, can be received via a user interface. A stored lookup table can be accessed to convert the sound pressure level to a first product-specific logical volume level for each speaker. The stored lookup table can tabulate the non-standardized relationship between logical volume level and sound pressure level for each speaker. Data corresponding to the first product-specific logical volume level can be transmitted to each speaker.

20 Claims, 3 Drawing Sheets

(56) References Cited

U.S. PATENT DOCUMENTS

| | | | |
|---|---|---|---|
| 9,112,466 | B1 | 8/2015 | Koh et al. |
| 10,795,637 | B2 | 10/2020 | Lau |
| 2007/0263891 | A1 | 11/2007 | Von et al. |
| 2009/0245538 | A1* | 10/2009 | Tomita .................... H03G 3/30 381/107 |
| 2009/0315708 | A1 | 12/2009 | Walley et al. |
| 2012/0063615 | A1 | 3/2012 | Crockett et al. |
| 2014/0037108 | A1 | 2/2014 | Christoph |
| 2014/0135078 | A1 | 5/2014 | Nigam et al. |
| 2015/0156588 | A1 | 6/2015 | Kyriakakis et al. |
| 2015/0304772 | A1 | 10/2015 | Risberg et al. |
| 2016/0037276 | A1 | 2/2016 | Risbo et al. |
| 2018/0357037 | A1 | 12/2018 | Lau |

OTHER PUBLICATIONS

"U.S. Appl. No. 15/617,692, Advisory Action dated Dec. 18, 2019", 3 pgs.

"U.S. Appl. No. 15/617,692, Appeal Brief filed Apr. 10, 2020", 21 pgs.

"U.S. Appl. No. 15/617,692, Decision on Appeal Brief dated Feb. 27, 2020", 3 pgs.

"U.S. Appl. No. 15/617,692, Final Office Action dated Sep. 20, 2018", 12 pgs.

"U.S. Appl. No. 15/617,692, Final Office Action dated Oct. 11, 2019", 12 pgs.

"U.S. Appl. No. 15/617,692, Non Final Office Action dated Feb. 16, 2018", 11 pgs.

"U.S. Appl. No. 15/617,692, Non Final Office Action dated Apr. 5, 2019", 11 pgs.

"U.S. Appl. No. 15/617,692, Notice of Allowance dated Jun. 17, 2020", 10 pgs.

"U.S. Appl. No. 15/617,692, Pre-Appeal Brief Request filed Feb. 10, 2020", 5 pgs.

"U.S. Appl. No. 15/617,692, Response filed Feb. 21, 2019 to Final Office Action dated Sep. 2, 2018", 12 pgs.

"U.S. Appl. No. 15/617,692, Response Filed May 1, 2018 to Non Final Office Action dated Feb. 16, 2018", 11 pgs.

"U.S. Appl. No. 15/617,692, Response filed Jul. 2, 2019 to Non Final Office Action dated Apr. 5, 2019", 11 pgs.

"U.S. Appl. No. 15/617,692, Response filed Nov. 26, 2019 to Final Office Action dated Oct. 11, 2019", 10 pgs.

"U.S. Appl. No. 15/617,692, Supplmental Amendment filed Aug. 21, 2018", 7 pgs.

"Dynamic Range", Wikipedia, [Online]. Retrieved from the Internet: <https://en.wikipedia.Org/wiki/Dynamic_range#Audio>, (Feb. 2, 2018), 12 pgs.

"International Application Serial No. PCT/US2018/036656, Response filed Apr. 8, 2019 to Written Opinion dated Jul. 9, 2018", 7 pgs.

"International Application Serial No. PCT/US2018/036656, International Preliminary Report on Patentability dated Sep. 5, 2019", 6 pgs.

"International Application Serial No. PCT/US2018/036656, International Search Report dated Jul. 9, 2018", 3 pgs.

"International Application Serial No. PCT/US2018/036656, Written Opinion dated Jul. 9, 2018", 6 pgs.

* cited by examiner

ADJUSTING VOLUME LEVELS OF SPEAKERS

CROSS-REFERENCE TO RELATED APPLICATION

This application is a Continuation of U.S. patent application Ser. No. 15/617,692 filed on Jun. 8, 2017, the contents of which are incorporated herein by reference in their entirety.

FIELD OF THE DISCLOSURE

The present disclosure relates to adjusting a volume level of one or more speakers.

BACKGROUND OF THE DISCLOSURE

When the volume is adjusted in a multi-speaker system, it is desirable that one speaker does not change volume disproportionately with respect to another speaker. For example, in a system that includes two speakers made by different manufacturers, the relationship between logical volume level (e.g., a digital value sent to the speaker) and actual volume produced by the speaker can vary between the speakers. As a result, sending a particular value of logical volume level (e.g., a level of "11") to these two speakers may cause one speaker to be significantly louder than the other. This can lead to a perception of imbalance between the speakers, which is undesirable.

SUMMARY

One example can include a method for adjusting a volume level of a first speaker. The first speaker can have a non-standardized relationship between logical volume level that is input to the speaker and sound pressure level that is produced by the speaker. A selected volume level corresponding to a sound pressure level can be received via a user interface. A stored lookup table can be accessed to convert the sound pressure level to a first product-specific logical volume level for the first speaker. The stored lookup table can tabulate the non-standardized relationship between logical volume level and sound pressure level for the first speaker. Data corresponding to the first product-specific logical volume level can be transmitted to the first speaker.

Another example can include a method for adjusting volume levels of first and second speakers. The first and second speakers can each have a non-standardized relationship between logical volume level that is input to the speaker and sound pressure level that is produced by the speaker. A selected volume level corresponding to a sound pressure level can be received via a user interface. A stored lookup table can be accessed to convert the sound pressure level to first and second product-specific logical volume levels for the first and second speakers, respectively. The stored lookup table can tabulate the non-standardized relationships between logical volume level and sound pressure level for the first and second speakers. Data corresponding to the first product-specific logical volume level can be transmitted to the first speaker. Data corresponding to the second product-specific logical volume level can be transmitted to the second speaker.

Another example can include a system. The system can include a processor, and a memory device storing instructions executable by the processor. The instructions can being executable by the processor to perform a method for adjusting a volume level of a first speaker. The first speaker can have a non-standardized relationship between logical volume level that is input to the speaker and sound pressure level that is produced by the speaker. A selected volume level corresponding to a sound pressure level can be received via a user interface. A stored lookup table can be accessed to convert the sound pressure level to a first product-specific logical volume level for the first speaker. The stored lookup table can tabulate the non-standardized relationship between logical volume level and sound pressure level for the first speaker. Data corresponding to the first product-specific logical volume level can be transmitted to the first speaker.

BRIEF DESCRIPTION OF THE DRAWINGS

Corresponding reference characters indicate corresponding parts throughout the several views. Elements in the drawings are not necessarily drawn to scale. The configurations shown in the drawings are merely examples, and should not be construed as limiting the scope of the invention in any manner.

DETAILED DESCRIPTION

Figure 1:
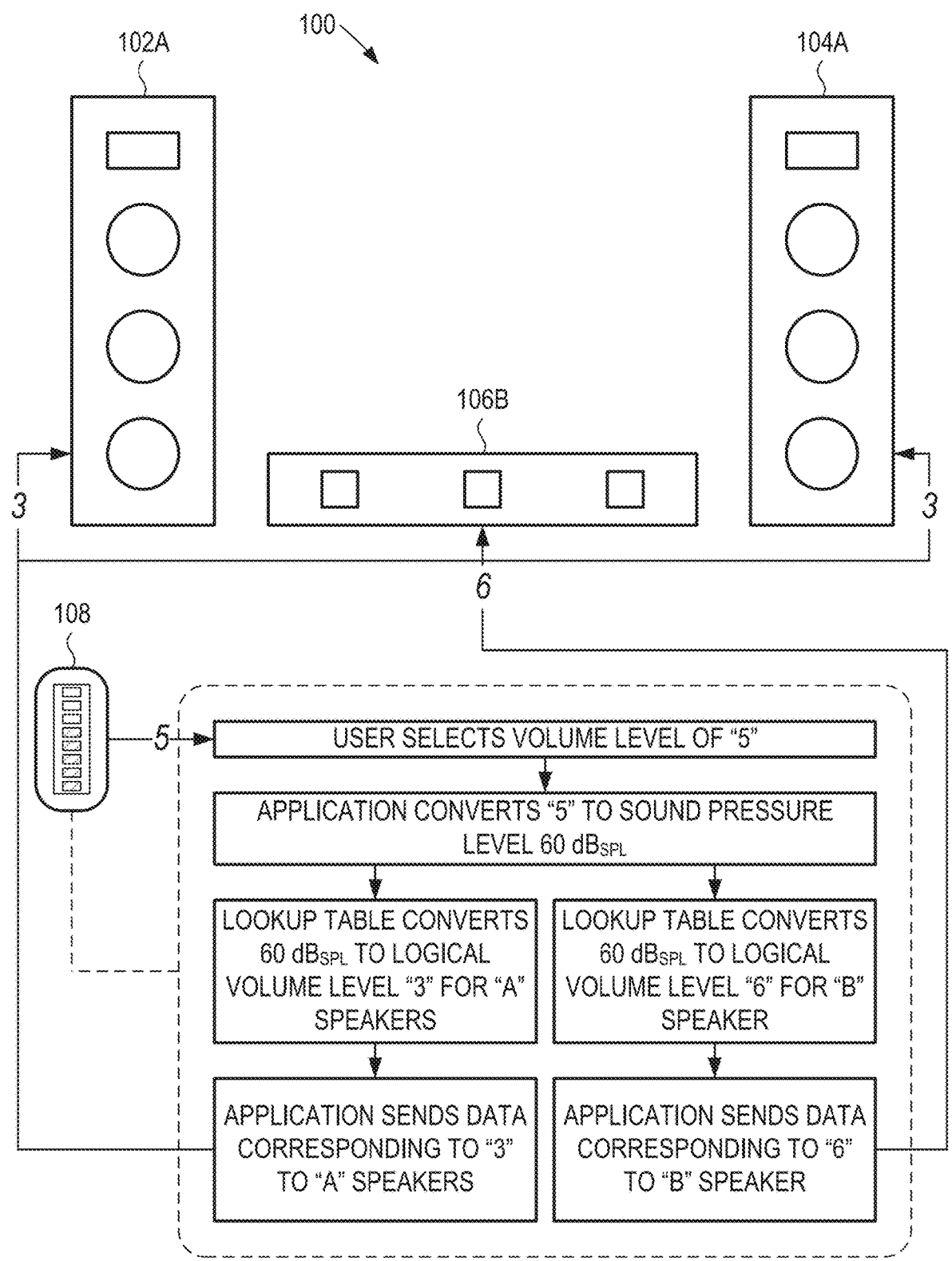
FIG. 1 shows a block diagram of an example of a volume-control system that can control the volume of a single speaker, or one or more speakers in a multi-speaker audio system, in accordance with some examples.

FIG. 1 shows a block diagram of an example of a volume-control system that can control the volume of a single speaker, or one or more speakers in a multi-speaker audio system, in accordance with some examples.

In this example, speakers 102A and 104A are a matched pair of speakers (e.g., two units of the same product). Speaker 106B is a different speaker product from 102A and 104A, and can be made by the same manufacturer or a different manufacturer. The speakers 102A, 104A, and 106B can each have a non-standardized relationship between logical volume level that is input to the speaker and sound pressure level that is produced by the speaker. Speaker 106B can have a different relationship between logical volume level and sound pressure level than speakers 102A and 104A.

The volume-control system can run as an application on a user device 108. The application can present a user interface to a user on a screen of the user device. A user selects a desired volume level on the user interface. In this example, the desired volume level is "5".

In this example, the desired volume level is specified in non-standard units. The application can convert the desired volume of "5" to a standardized measure of volume. In this example, the standardized measure of volume is sound pressure level, although other standardized measures can also be used. In this example, the application converts "5" to a sound pressure level of 60 decibels, or 60 $dB_{SPL}$.

The application can access a lookup table to convert the sound pressure level to a product-specific logical volume levels for each speaker. The lookup table can be maintained by an owner or operator of the application, and can include measured data for each speaker. The measured data can tabulate the relationship between logical volume level sent to the speaker and sound pressure level produced by the speaker. In this example, the application can convert 60 $dB_{SPL}$ to a logical volume level of "3" for speakers 102A and 104A, and "6" for speaker 106B. In other words, setting speaker 102A to "3" produces a sound pressure level of 60 $dB_{SPL}$, setting speaker 104A to "3" produces a sound pressure level of 60 $dB_{SPL}$, and setting speaker 106B to "6" produces a sound pressure level of 60 $dB_{SPL}$.

The application can transmit data corresponding to each product-specific logical volume level to the respective speaker. In this example, the application sends a logical volume level of "3" to speakers 102A and 104A, and a logical volume level of "6" to speaker 106B.

By adjusting the volume in this manner, the application can ensure that speaker volumes are adjusted together in a manner that does not raise or lower the volume of one speaker disproportionately over another speaker.

Figure 2:
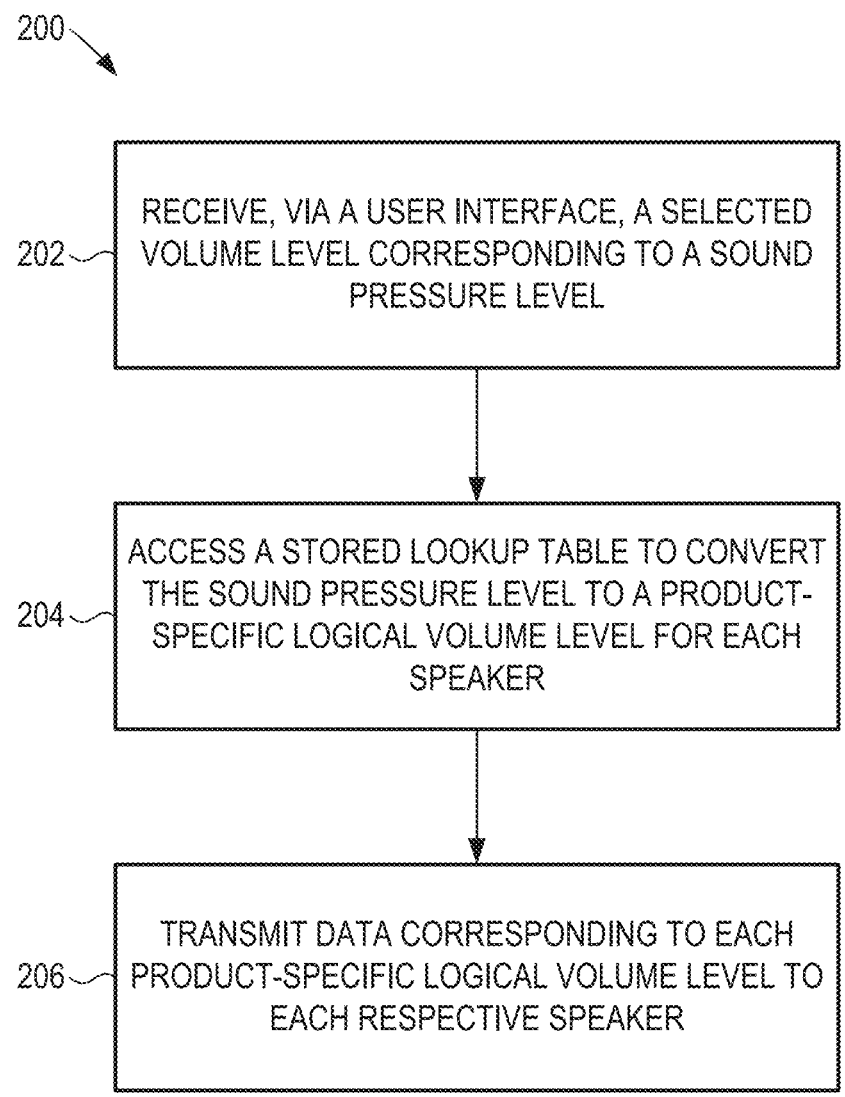
FIG. 2 shows a flowchart of an example of a method for adjusting a volume level of a speaker, in accordance with some examples.

FIG. 2 shows a flowchart of an example of a method for adjusting a volume level of a speaker, in accordance with some examples. The method can also adjust volume levels of first and second speakers, or any suitable number of speakers, such as in a multi-speaker sound system. In some examples, the method can adjust the volume levels simultaneously. In some examples, the method can be executed by a software application stored locally on a user device, such as a smart phone, a tablet, a laptop, a computer, a computing device, or another suitable device.

The speaker can have a non-standardized relationship between logical volume level that is input to the speaker and sound pressure level that is produced by the speaker. In many cases, logical volume level may not be standardized from product-to-product or manufacturer-to-manufacturer. For example, a logical volume level of "3" may produce a sound pressure level of 50 $dB_{SPL}$, for one particular speaker product, but 55 $dB_{SPL}$, for another speaker product. These numerical values are but examples; other suitable numerical values can also be used.

At operation 202, the software application can receive, via a user interface, a selected volume level corresponding to a sound pressure level. In some examples, the software application can display the user interface on a screen of a user device. In some examples, the screen can be touch-sensitive. In some examples, the software application can receive the selected volume level on the touch-sensitive screen. In some examples, the user interface can include one or more controls that resemble the volume controls on a remote control device. For example, a user can select a volume level of "3" on the user interface.

Because the selected volume level, 3, is not standardized from product-to-product or manufacturer-to-manufacturer, the software can relate the selected volume level to a sound pressure level. Sound pressure levels are standardized, and are defined as the local pressure deviation from the ambient (average, or equilibrium) atmospheric pressure, caused by a sound wave. For example, the software can relate the selected volume level of 3 to a sound pressure level of 60 $dB_{SPL}$, which can correspond roughly to a relatively quiet volume, such as for conversation speech at a distance of 1 meter. If the user cranks the volume to 11, the software can relate the selected volume level of 11 to a sound pressure level of 100 $dB_{SPL}$, which can correspond roughly to a relatively loud volume, such as a location 1 meter away from a speaker in loud nightclub. These numerical values are but mere examples, and other suitable values can also be used.

At operation 204, the software application can access a stored lookup table to convert the sound pressure level to a product-specific logical volume level for the speaker. The stored lookup table can tabulate the non-standardized relationship between logical volume level and sound pressure level for the speaker, and optionally, for additional speaker products. The lookup table can provide the logical value of a particular speaker that will produce a specific sound pressure level for that speaker. For matched speakers, such as a pair of speakers that are two units of the same product made by the same manufacturer, the lookup table can include one tabulation that covers all the matched speakers. It is intended that the stored lookup table include one measured set of values for each speaker product that is commercially available. It is not intended that the stored lookup table address part-to-part variations of the same speaker product.

In some examples, the stored lookup table can be maintained or updated by a manufacturer of the software application, and can include a measured relationship between logical volume level and sound pressure level for each of the speakers included in the stored lookup table. In some examples, the stored lookup table can be updated as needed to include additional speaker products that are introduced to the marketplace. In some examples, more than one stored lookup table can be used. In some examples, the stored lookup table can be stored locally on the user device. In some examples, the stored lookup table can tabulate the non-standardized relationship between logical volume level and sound pressure level for multiple speakers, of which at least two speakers can be different products.

In some examples, for at least one of the plurality of speakers, the stored lookup table can include only discrete values of logical volume level. For these examples, for a sound pressure level that corresponds to a logical volume level that falls between two tabulated values, the software application can select a closer of the two tabulated values. For example, for a specified sound pressure level of 73 $dB_{SPL}$, and tabulated values in the lookup table of 72 $dB_{SPL}$ for a logical volume level of 5 and 75 $dB_{SPL}$ for a logical volume level of 6, the software application can select the logical volume level of 5 as being closer to the specified sound pressure level. This is but a numerical example; other suitable values can also be used.

In other examples, the software application can interpolate to generate an intermediate logical volume level that falls between the discrete values. In some examples, for at least one of the plurality of speakers, the stored lookup table can include a mathematical relationship that allows calculation of logical volume level from the sound pressure level. In some examples, for at least one of the plurality of speakers, the stored lookup table can include only values of logical volume level at which the sound pressure level is less than or equal to a specified maximum sound pressure level for the speaker, which can prevent damage to the speaker.

At operation 206, the software application can transmit data corresponding to the first product-specific logical volume level to the first speaker. In some examples, in which the software application can control multiple speakers, the software application can transmit data corresponding to the each product-specific logical volume level to each respective speaker.

In some examples, the receiving at operation 202, the accessing at operation 204, and the transmitting at operation 206 can be initiated automatically by the software application. In other examples, one or more of these operations can be initiated automatically by a server connected to the software application on the user device.

Figure 3:
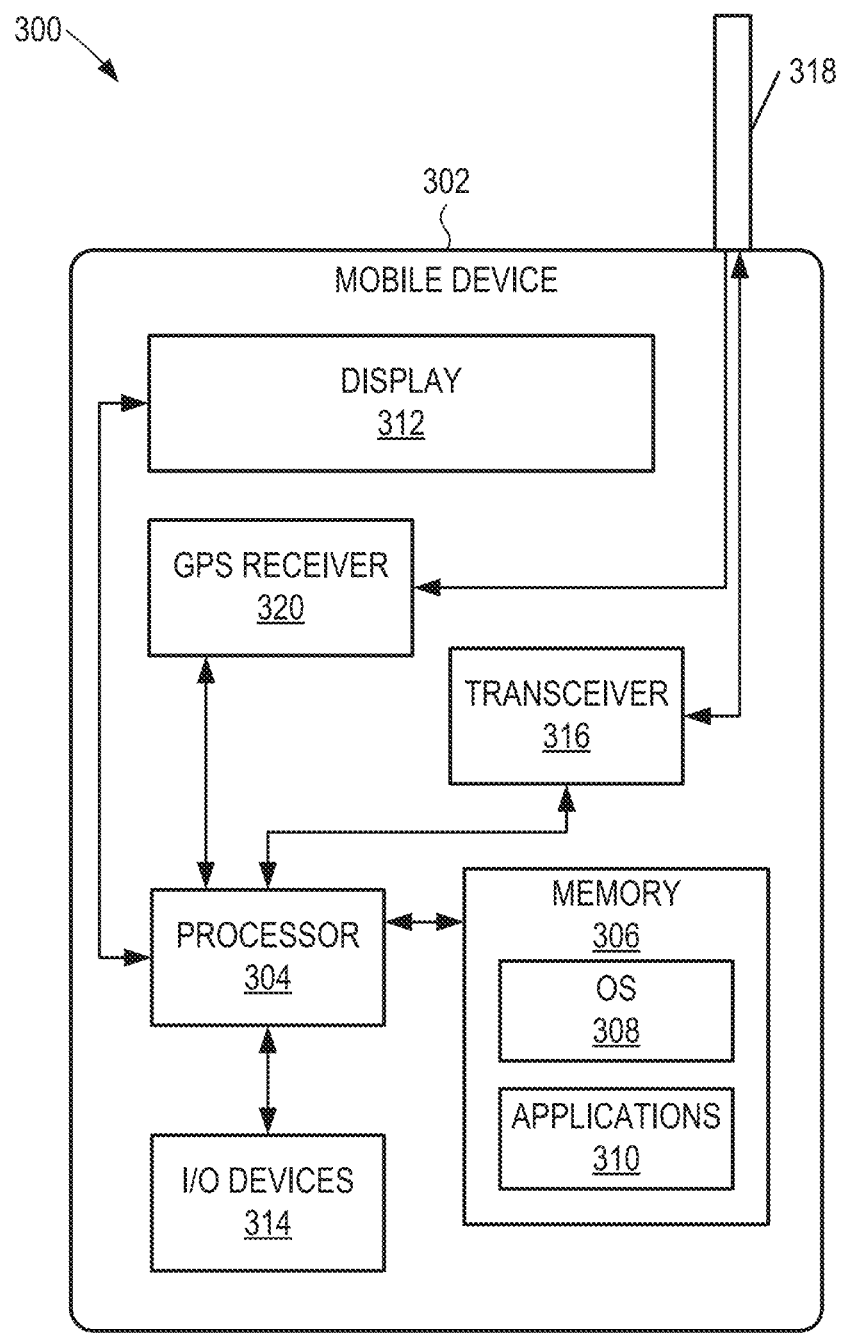
FIG. 3 is a block diagram showing an example of a volume-control system that can be used to adjust the volume of one speaker, or simultaneously adjust the volume of two or more speakers in a multi-speaker system, in accordance with some examples.

FIG. 3 is a block diagram showing an example of a volume-control system 300 that can be used to adjust the volume of one speaker, or simultaneously adjust the volume of two or more speakers in a multi-speaker system, in accordance with some examples. The volume-control system 300 is but one example of such a volume-control system; other suitable volume-control systems can also be used. In some examples, the volume-control system 300 can execute the method 200 of FIG. 2; other suitable volume-control systems can also execute the method 200 of FIG. 2.

In some examples, the volume-control system 300 can be configured as software executable on a user device, such as a smart phone, a tablet, a laptop, a computer, or another suitable device. In the specific example of FIG. 3, the volume-control system 300 includes a software application that can run on a mobile device 302, such as a smart phone.

The volume-control system 300 can include a processor 304, and a memory device 306 storing instructions executable by the processor 304. The instructions can be executed by the processor 304 to perform a method for adjusting a volume level of a first speaker, a first speaker and a second speaker, or more than two speakers in a multi-speaker system.

The mobile device 302 can include a processor 304. The processor 304 may be any of a variety of different types of commercially available processors 304 suitable for mobile devices 302 (for example, an XScale architecture microprocessor, a microprocessor without interlocked pipeline stages (MIPS) architecture processor, or another type of processor 304). A memory 306, such as a random access memory (RAM), a flash memory, or other type of memory, is typically accessible to the processor 304. The memory 306 may be adapted to store an operating system (OS) 308, as well as application programs 310, such as a mobile location enabled. In some examples, the memory 306 can store the lookup table discussed above. The processor 304 may be coupled, either directly or via appropriate intermediary hardware, to a display 312 and to one or more input/output (I/O) devices 314, such as a keypad, a touch panel sensor, a microphone, and the like. In some examples, the display 312 can display the user interface to a user, and can receive selection of a desired volume level from the user. Similarly, in some examples, the processor 304 may be coupled to a transceiver 316 that interfaces with an antenna 318. The transceiver 316 may be configured to both transmit and receive cellular network signals, wireless data signals, or other types of signals via the antenna 318, depending on the nature of the mobile device 302. Further, in some configurations, a GPS receiver 320 may also make use of the antenna 318 to receive GPS signals. In some examples, the transceiver 316 can transmit signals over a wireless network that correspond to logical volume levels for respective speakers in a multi-speaker system.

While this invention has been described as having example designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for adjusting a volume level of a first speaker and a second speaker, the first speaker having a first non-standardized relationship between logical volume level that is input to the speaker and sound pressure level that is produced by the speaker, the second speaker having a second non-standardized relationship between logical volume level that is input to the speaker and sound pressure level that is produced by the speaker, the first non-standardized relationship being different from the second non-standardized relationship, the method comprising:
  receiving, via a user interface, a selected volume level corresponding to a sound pressure level;
  in response to the received selected volume level, automatically accessing a software application that allows access to a stored lookup table to convert the sound pressure level to a first product-specific logical volume level for the first speaker and to a second product-specific logical volume level for the second speaker, the stored lookup table tabulating non-standardized relationships between logical volume level and sound pressure level for a plurality of product-specific speakers including the first speaker and the second speaker, the first product-specific logical volume level differing from the second product-specific logical volume level;
  in response to the received selected volume level, automatically transmitting first data corresponding to the first product-specific logical volume level to the first speaker; and
  in response to the received selected volume level, automatically transmitting second data corresponding to the second product-specific logical volume level to the second speaker.

2. The method of claim 1, wherein the first speaker and the second speaker are different products.

3. The method of claim 1, wherein the software application is configured to, in response to the receiving, initiate the accessing and the transmitting.

4. The method of claim 1, wherein the software application is stored locally on a user device.

5. The method of claim 4, wherein the stored lookup table is stored locally on the user device.

6. The method of claim 1, wherein the stored lookup table tabulates measured relationships between logical volume level and sound pressure level for the plurality of product-specific speakers, the plurality of product-specific speakers including the first speaker and the second speaker.

7. The method of claim 1, wherein, for at least one of the plurality of product-specific speakers:
  the stored lookup table includes only discrete values of logical volume level; and
  for a sound pressure level that corresponds to a logical volume level that falls between two tabulated values, the software application selects a closer of the two tabulated values.

8. The method of claim 1, wherein, for at least one of the plurality of product-specific speakers:
  the stored lookup table includes a mathematical relationship that allows calculation of logical volume level from the sound pressure level.

9. The method of claim 1, wherein, for at least one of the plurality of product-specific speakers:
  the stored lookup table includes only values of logical volume level at the sound pressure level is less than or equal to a specified maximum sound pressure level for the speaker.

10. The method of claim 1, wherein:
the relationship between logical volume level and sound pressure level for the first speaker is independent of audio content sent to the first speaker, and
the relationship between logical volume level and sound pressure level for the second speaker is independent of audio content sent to the second speaker.

11. A method for adjusting a volume level of a first speaker and a second speaker, the first speaker having a first non-standardized relationship between logical volume level that is input to the speaker and sound pressure level that is produced by the speaker, the second speaker having a second non-standardized relationship between logical volume level that is input to the speaker and sound pressure level that is produced by the speaker, the first non-standardized relationship being different from the second non-standardized relationship, the method comprising:
receiving, via a user interface, a first selected volume level corresponding to a first sound pressure level;
in response to the received first selected volume level, automatically accessing a software application that allows access to a stored lookup table to convert the first sound pressure level to a first product-specific logical volume level for the first speaker and to a second product-specific logical volume level for the second speaker, the stored lookup table tabulating non-standardized relationships between logical volume level and sound pressure level for a plurality of product-specific speakers including the first speaker and the second speaker, the first product-specific logical volume level differing from the second product-specific logical volume level;
in response to the received first selected volume level, automatically transmitting first data corresponding to the first product-specific logical volume level to the first speaker;
in response to the received first selected volume level, automatically transmitting second data corresponding to the second product-specific logical volume level to the second speaker;
receiving, via the user interface, a second selected volume level corresponding to a second sound pressure level;
in response to the received second selected volume level, automatically accessing the software application to convert the second sound pressure level to a third product-specific logical volume level for the first speaker and to a fourth product-specific logical volume level for the second speaker, the third product-specific logical volume level differing from the fourth product-specific logical volume level;
in response to the received second selected volume level, automatically transmitting third data corresponding to the third product-specific logical volume level to the first speaker;
in response to the received first second selected volume level, automatically transmitting fourth data corresponding to the fourth product-specific logical volume level to the second speaker.

12. The method of claim 11, wherein the software application is configured to, in response to the receiving, initiate the accessing and the transmitting.

13. The method of claim 11, wherein the software application is stored locally on a user device.

14. The method of claim 13, wherein the stored lookup table is stored locally on the user device.

15. The method of claim 11, wherein the stored lookup table tabulates measured relationships between logical volume level and sound pressure level for the plurality of product-specific speakers, the plurality of product-specific speakers including the first speaker and the second speaker.

16. The method of claim 11, wherein, for at least one of the plurality of product-specific speakers:
the stored lookup table includes only discrete values of logical volume level; and
for a sound pressure level that corresponds to a logical volume level that falls between two tabulated values, the software application selects a closer of the two tabulated values.

17. The method of claim 11, wherein, for at least one of the plurality of product-specific speakers:
the stored lookup table includes a mathematical relationship that allows calculation of logical volume level from the sound pressure level.

18. The method of claim 11, wherein, for at least one of the plurality of product-specific speakers:
the stored lookup table includes only values of logical volume level at which the sound pressure level is less than or equal to a specified maximum sound pressure level for the speaker.

19. The method of claim 11, wherein:
the relationship between logical volume level and sound pressure level for the first speaker is independent of audio content sent to the first speaker, and
the relationship between logical volume level and sound pressure level for the second speaker is independent of audio content sent to the second speaker.

20. A volume-control system, comprising:
a processor; and
a memory device storing instructions executable by the processor, the instructions being executable by the processor to perform a method for adjusting a volume level of a first speaker and a second speaker, the first speaker and the second speaker each having non-standardized and different relationships between logical volume level that is input to the speaker and sound pressure level that is produced by the speaker, the method comprising:
receiving, via a user interface, a selected volume level corresponding to a sound pressure level;
in response to the received selected volume level, automatically accessing a software application that allows access to a stored lookup table to convert the sound pressure level to a first product-specific logical volume level for the first speaker and to a second product-specific logical volume level for the second speaker, the stored lookup table tabulating non-standardized relationships between logical volume level and sound pressure level for a plurality of product-specific speakers including the first speaker and the second speaker, the first product-specific logical volume level differing from the second product-specific logical volume level;
in response to the received selected volume level, automatically transmitting first data corresponding to the first product-specific logical volume level to the first speaker; and
in response to the received selected volume level, automatically transmitting second data corresponding to the second product-specific logical volume level to the second speaker.

* * * * *